く12) United States Patent
Zhou et al.

(10) Patent No.: US 9,196,219 B1
(45) Date of Patent: Nov. 24, 2015

(54) CUSTOM COLOR SPECTRUM FOR SKIN DETECTION

(75) Inventors: Dong Zhou, San Jose, CA (US); Kenneth M. Karakotsios, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/552,213

(22) Filed: Jul. 18, 2012

(51) Int. Cl.
*G06F 3/01* (2006.01)
*G09G 5/06* (2006.01)

(52) U.S. Cl.
CPC ... *G09G 5/06* (2013.01); *G06F 3/01* (2013.01)

(58) Field of Classification Search
CPC ............... G02B 2027/014; G02B 2027/0187; G02B 2027/0112; G06F 3/011; G06F 3/017
USPC ........................................................ 382/103
See application file for complete search history.

(56) References Cited

U.S. PATENT DOCUMENTS

| | | | |
|---|---|---|---|
| 4,430,004 A | 2/1984 | Nitschke | |
| 6,593,942 B1 | 7/2003 | Bushmitch et al. | |
| 8,522,163 B2 | 8/2013 | Relyear et al. | |
| 8,613,018 B2 | 12/2013 | Kim et al. | |
| 8,627,236 B2 | 1/2014 | Jung et al. | |
| 2003/0007420 A1 | 1/2003 | Shteyn | |
| 2006/0034161 A1 | 2/2006 | Muller | |
| 2006/0168545 A1 | 7/2006 | Niittynen et al. | |
| 2008/0022365 A1 | 1/2008 | Chae et al. | |
| 2008/0181459 A1* | 7/2008 | Martin et al. ................. | 382/103 |
| 2008/0186275 A1 | 8/2008 | Anderson | |
| 2010/0039378 A1* | 2/2010 | Yabe et al. ..................... | 345/156 |
| 2011/0211754 A1* | 9/2011 | Litvak et al. .................. | 382/165 |
| 2011/0222726 A1* | 9/2011 | Ruan .............................. | 382/103 |
| 2011/0249863 A1* | 10/2011 | Ohashi et al. ................. | 382/103 |
| 2011/0261048 A1 | 10/2011 | Lee et al. | |
| 2012/0056878 A1 | 3/2012 | Miyazawa et al. | |
| 2012/0066629 A1 | 3/2012 | Lee et al. | |
| 2012/0066648 A1 | 3/2012 | Rolleston et al. | |
| 2012/0084734 A1 | 4/2012 | Wilairat | |
| 2012/0154301 A1 | 6/2012 | Kang et al. | |
| 2012/0154378 A1 | 6/2012 | Kitchens | |
| 2012/0197998 A1 | 8/2012 | Kessel et al. | |
| 2013/0170324 A1 | 7/2013 | Tu et al. | |
| 2013/0235069 A1* | 9/2013 | Ubillos et al. ................ | 345/594 |

OTHER PUBLICATIONS

Rip Empson, "Read Offline: News.me Automatically Downloads Your News Whenever You Leave Home", "TechCrunch", Apr. 22, 2012, pp. 2 Publisher: www.TechCrunch.com, Published in: US.
U.S. Appl. No. 12/180,325, filed Jul. 25, 2008, Narasimhan et al., "Communication Management Based on Communication Events."
U.S. Appl. No. 13/172,727, filed Jun. 29, 2011, Karakotsios et al., "User Identification by Gesture Recognition".
U.S. Appl. No. 13/352,087, filed Jan. 17, 2012, Zhou et al., "Managing Resource Usage for Task Performance".

* cited by examiner

*Primary Examiner* — Vu Le
*Assistant Examiner* — Kenny Cese
(74) *Attorney, Agent, or Firm* — Athorus, PLLC

(57) ABSTRACT

The implementations described include automatically detecting an object in a series of images, identifying that object as having a hand shape, obtaining color value samples from the object and utilizing those color values to generate a custom color spectrum from use in detecting and tracking a user's hand. In some implementations, the custom color spectrum may be periodically updated by obtaining additional color value samples of the user's hand and updating the custom color spectrum to include those color value samples.

22 Claims, 7 Drawing Sheets

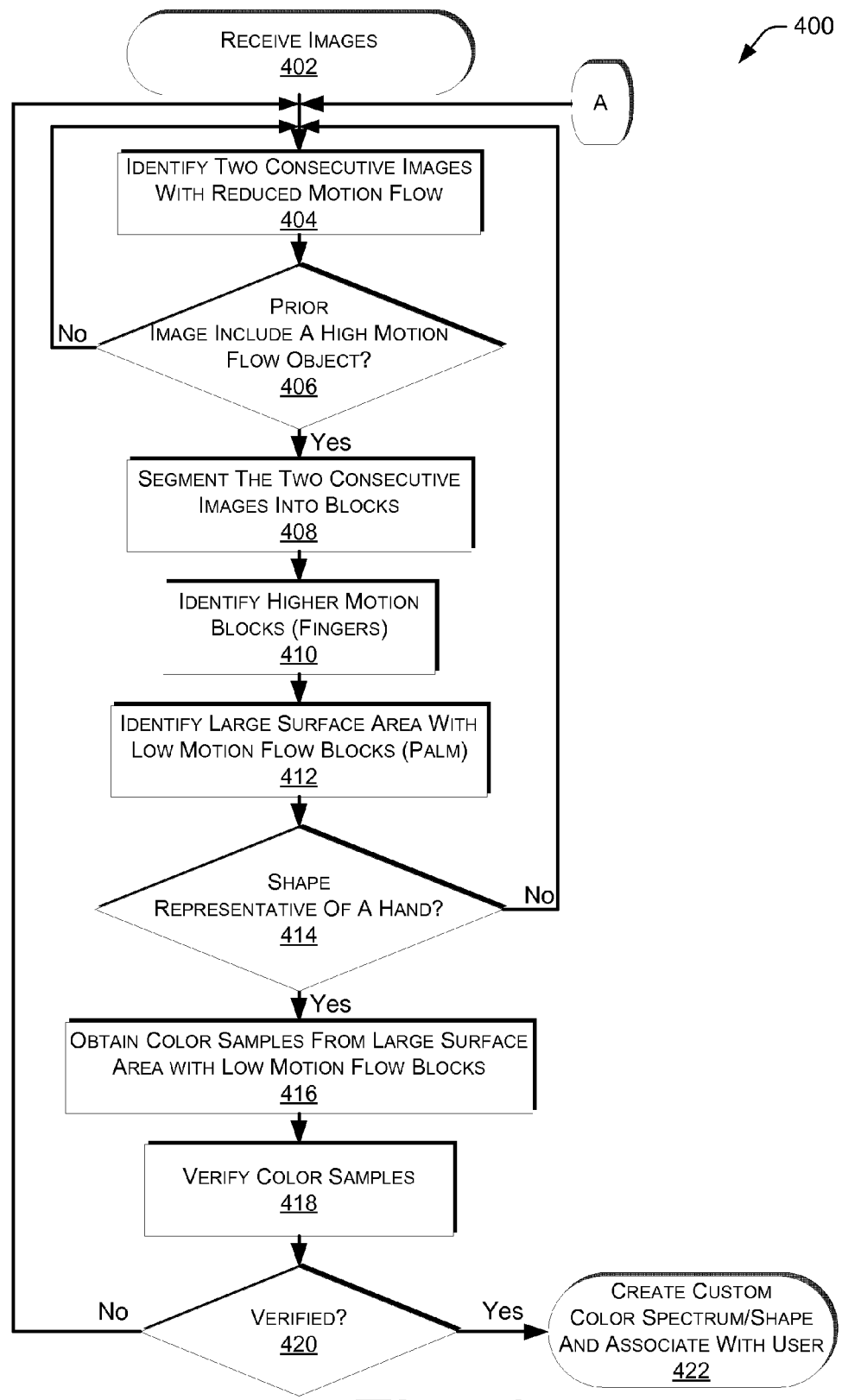

CUSTOM COLOR SPECTRUM FOR SKIN DETECTION

BACKGROUND

People are increasingly interacting with computers and other electronic devices in new and interesting ways. One such interactive approach involves making a detectable motion with respect to a device, which can be detected using a camera or other such element. While image recognition can be used with existing cameras to determine various types of motion, the amount of processing needed to analyze full color, high resolution images is generally very high. This can be particularly problematic for portable devices that might have limited processing capability and/or limited battery life, which can be significantly drained by intensive image processing. Some devices utilize basic gesture detectors, but these detectors are typically very limited in capacity and are only able to detect simple motions such as up-and-down, right-or-left, and in-and-out. These detectors are not able to handle more complex gestures, such as holding up a certain number of fingers or pinching two fingers together.

In addition, there are a variety of techniques used to try and identify and track the motion of a user's hand to support gesture recognition. For example, techniques to separate a user's hand from background information in an image may utilize infra-red (IR) based approaches and/or time-of-flight based three-dimensional cameras. However, these techniques require active power emission and/or are computationally intensive, often making them non-desirable in portable devices. Other techniques include color segmentation that utilizes a set color spectrum to attempt to identify and distinguish a user's hand from background information. However, this technique has not been successful because if the selected color spectrum is too broad, it will not differentiate the hand from background images. In contrast, if the color spectrum is too narrow it may not identify the user's hand. In addition, even if it does initially detect the user's hand, the detection may fail under varying light conditions (e.g., indoor, outdoor, different lights).

Further, cameras in many portable devices such as cell phones often have what is referred to as a "rolling shutter" effect. Each pixel of the camera sensor accumulates charge until it is read, with each pixel being read in sequence. Because the pixels provide information captured and read at different times, as well as the length of the charge times, such cameras provide poor results in the presence of motion. A motion such as waiving a hand or moving one or more fingers will generally appear as a blur in the captured image, such that the actual motion and object cannot accurately be determined.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 illustrates a flow diagram of an example process for automatically generating a custom color spectrum based on information obtained from a series of images.

DETAILED DESCRIPTION

Figure 1:
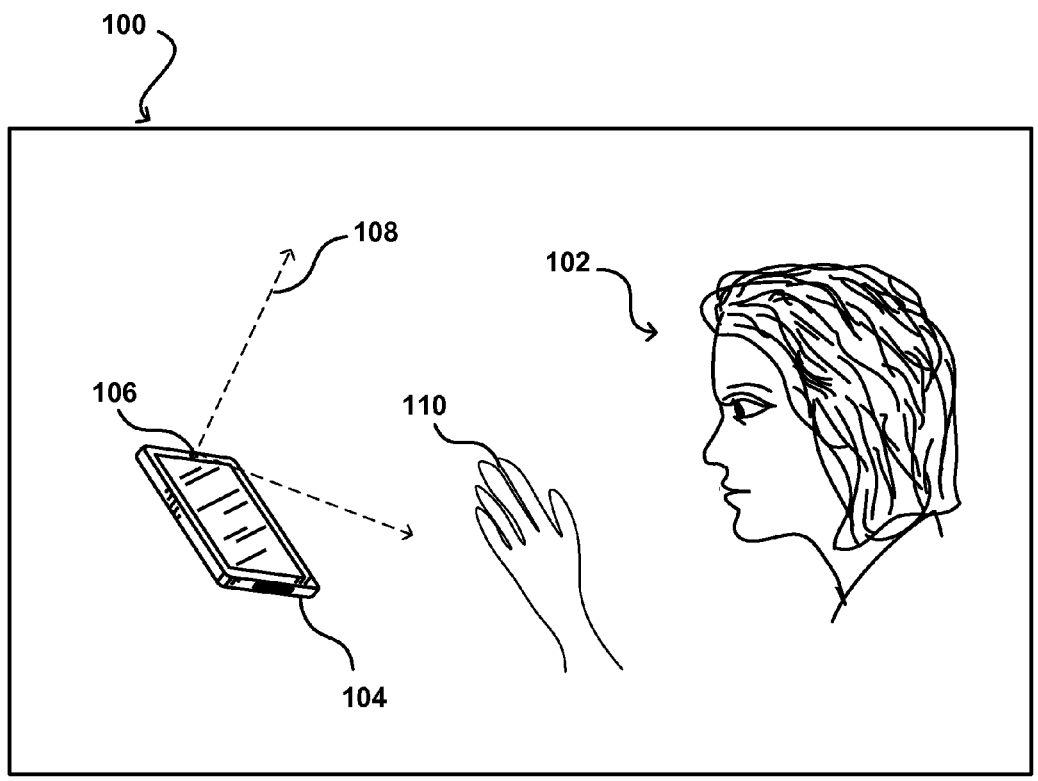
FIG. 1 illustrates an example environment in which various implementations may be utilized.

This disclosure describes, in part, computing devices that can identify and track the motion of an object, such as a hand, utilizing low computational power. In some implementations, this is accomplished by automatically detecting a hand's skin color and using that color to generate a custom color spectrum for use in identifying and tracking a user's hand as it moves within a camera's capture range. In addition, the custom color spectrum may be continually or periodically updated based on additional color information retrieved from the camera.

In some implementations, generating a custom color spectrum may be accomplished by monitoring a camera's capture range, or field of view, for a moving object that enters the camera's capture range and then stops or pauses momentarily. An object moving into the camera's field of view may be detected based on the calculation of motion flow. Once the moving object has stopped, a series of images of the object are captured and compared. In comparing the images, the shape of the object can be detected and if that shape is representative of the shape of a hand, using knowledge of a typical hand shape, a palm of the hand may be identified. Color value samples from the identified palm may then be retrieved and verified against a predefined color spectrum that includes a large variety, or all, possible skin color values. Upon pixel color verification, the sampled pixel color may be used to automatically generate a custom color spectrum for that user's hand and that custom color spectrum may be used to continue tracking the user's hand. Generally, a custom color spectrum is a range of color values around or similar to the color values sampled from the palm identified in the image. In some implementations, a custom color spectrum may be generated by setting minimum and maximum values for each of the red, green, blue ("RGB") values for the sampled color and including all combinations within those minimum and maximum values as the custom color spectrum. Other techniques may also be used to establish a custom color spectrum. Tracking may be accomplished by separating color values matching the custom color spectrum from other color values captured by the camera.

Motion flow, or motion estimation is the process of determining motion vectors that describe the transformation from one image to another. Motion vectors may relate to the whole image (global motion estimation) or specific parts, such as rectangular blocks, arbitrary shaped patches or even per pixel. A variety of techniques may be used to calculate motion flow and compute motion vectors. Those techniques can be categorized into direct methods, evaluation methods and indirect methods. Direct methods of motion flow calculation include block-matching algorithms (matching blocks in a sequence of images to define a vector), phase correlation and frequency domain methods, Bayesian estimation and optical flow calculation methods. Likewise, several evaluation metrics may be used to calculation motion flow including mean squared error, sum of absolute differences, sum of squared errors and sum of absolute transformed differences. Indirect methods for determining motion flow typically use features, such as Harris corners to match corresponding features between frames. Any motion flow technique may be used with the implementations discussed herein.

As the user continues to interact with the device, at periodic times (e.g., each time the user's hand pauses in the capture range of the camera), new color value samples may be retrieved and the custom color spectrum updated. In some implementations, the custom color spectrum may be updated by expanding the maximum and minimum RGB values to include the new color value samples and/or the maximum and minimum values that would surround those new color value samples. In other implementations, the custom color spectrum may be replaced with a new custom color spectrum generated from the new color value samples. Periodically updating the custom color spectrum enables hand detection of the device to adapt to changing environments, such as changing lighting conditions.

In addition to automatically generating a custom color spectrum for a user's hand and periodically updating that custom color spectrum, in some implementations, the custom color spectrum may be associated with the user and stored on the device and/or at a remote storage location for subsequent use. For example, once a custom color spectrum has been generated for a user, each time that user is detected as interacting with the device, the custom color spectrum may be utilized and updated, thereby further reducing computational power consumption and improving hand tracking accuracy for that user. User identification may be done using any variety of techniques, such as password identification, facial recognition, biometric identification, voice recognition, and the like.

In some implementations, the generated custom color spectrum may be stored at a remote computing location such that it is accessible by multiple computing devices. For example, if a custom color spectrum is generated on a portable computing device, it may be associated with the current user of that device and stored on that device. In addition, a portable computing device may transmit the custom color spectrum and the identification of the associated user to a remote computing resource that stores the color spectrum and associated user identification. Subsequently, if a different device, such as a desktop computer or other client computing device, detects the user, it may obtain the custom color spectrum associated with that user from the remote computer resource. That device then uses and/or updates the custom color spectrum and provides the updated custom color spectrum to the remote computing resource as well.

While this disclosure describes creation of a custom color spectrum for identifying and tracking of a user's hand, this example use is intended for ease of explanation only and should not be considered limiting. The implementations described herein may also be used to generate custom color spectrums for use identifying and tracking any other object.

FIG. 1 illustrates an example situation 100 wherein a user 102 would like to provide gesture- and/or motion-based input to a computing device 104, such as to wake up the device, flip to the next page in an electronic book ("e-book"), select an option of a graphical user interface (GUI), or perform another such action. Although a portable computing device 104 (e.g., a smart phone, an e-book reader, or tablet computer) is shown, it should be understood that various other types of electronic devices that are capable of determining and processing input can be used in accordance with various implementations discussed herein. These devices can include, for example, notebook computers, desktop computers, personal data assistants, cellular phones, video gaming consoles or controllers, portable media players, and the like. In this example, the computing device 104 has or is in communication with at least one camera 106 (e.g., a digital still camera, video camera, optical sensor, or other such image capture element) operable to perform image capture over an associated capture range 108. Each image capture element may be, for example, a charge-coupled device (CCD) or complimentary metal-oxide semiconductor (CMOS) sensor, for example, or can utilize another appropriate image capturing technology.

In this example, the user 102 has moved her hand 110 into the angular capture range 108 (i.e., field of view) of the at least one of camera 106 on the client device 104. The client device can capture image information including at least a portion of the user's hand 110, analyze the image information using at least one image or video analysis algorithm, and determine if the hand is moving or stationary by comparing adjacent images or portions of the image information.

Figure 2:
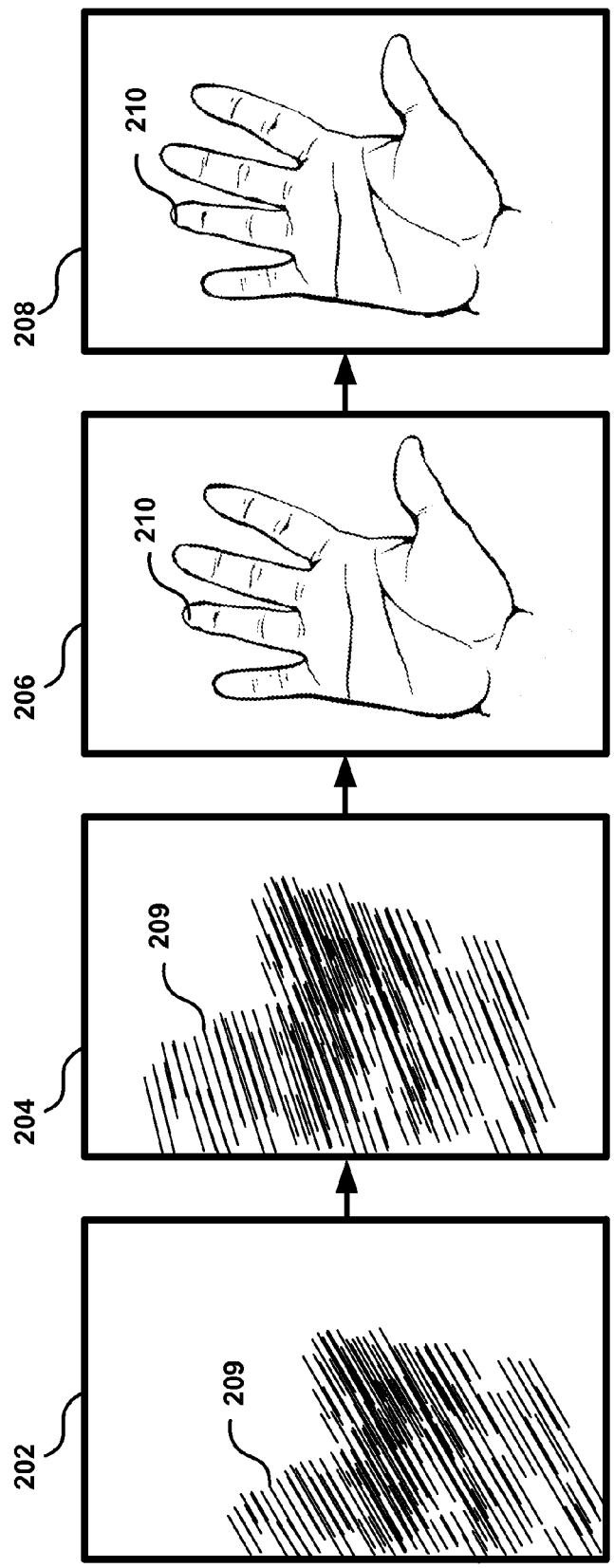
FIG. 2 depicts one example of an object moving into a cameras capture range and then stopping.

For example, FIG. 2 depicts one example of an object 210 moving into a cameras field of view and then stopping. In this example, the object 210 is moving into the camera's field of view from the left, as illustrated by images 202, 204 and eventually stopping in the camera's field of view, as illustrated by images 206, 208. As the object 210 enters the camera's field of view, its movement causes motion flow on some pixels of the image (such motion flow effect is more obvious on cameras with rolling shutter). For example, the images 202, 204 illustrate high motion flow pixels 209 that result from the object 210 moving into the camera's field of view. In contrast, as illustrated by images 206, 208, once the object 210 has become mostly stationary, the shape of the object can be identified. In this example, the object 210 is a hand. High motion flow pixels may be pixels in which the motion flow value between images exceeds a predetermined threshold. Low motion flow pixels may be pixels in which the motion flow value is below a predetermined threshold.

As discussed further, upon detection of a high motion flow object 210 coming into the cameras field of view, a series of images captured by the camera are monitored to determine when the high motion flow object 210 pauses or becomes stationary. Upon detection of at least one image 204 with a high motion flow object that is followed by at least two images 206, 208 in which the object 210 is stationary, a determination may be made that a moving object, such as a hand, has entered the cameras field of view. The object 210 may then be compared between the two mostly stationary images 206, 208 to determine the object's shape. For example, if the object 210 is a hand, it has some typical characteristics. The pixels representing the palm of the hand will generally have a large surface area with color values within a color value range (e.g., all similar colors). In addition, that large surface area will remain mostly stationary (low motion flow values). In comparison, the pixels representing and surrounding the fingers and thumb will have varying color values because of the spaces between the fingers/thumb and there will be pixels with similar color values that protrude in a direction away from the large surface area representing the palm of the hand. Likewise, the area containing the fingers will generally include more motion flow than the larger surface area representing the palm of the hand.

By detecting a large stationary surface area (e.g., a palm) surrounded by a series of elongated surface areas protruding away from the larger surface area (e.g., the fingers) an assessment can be made that the object 210 in the cameras field of view is representative of the shape of a hand. Such detection may be done by comparing segmented blocks of multiple images, through use of machine learning, a combination of block segmentation and machine learning, or any other technique to identify a object as resembling the shape of a hand.

Figure 3B:
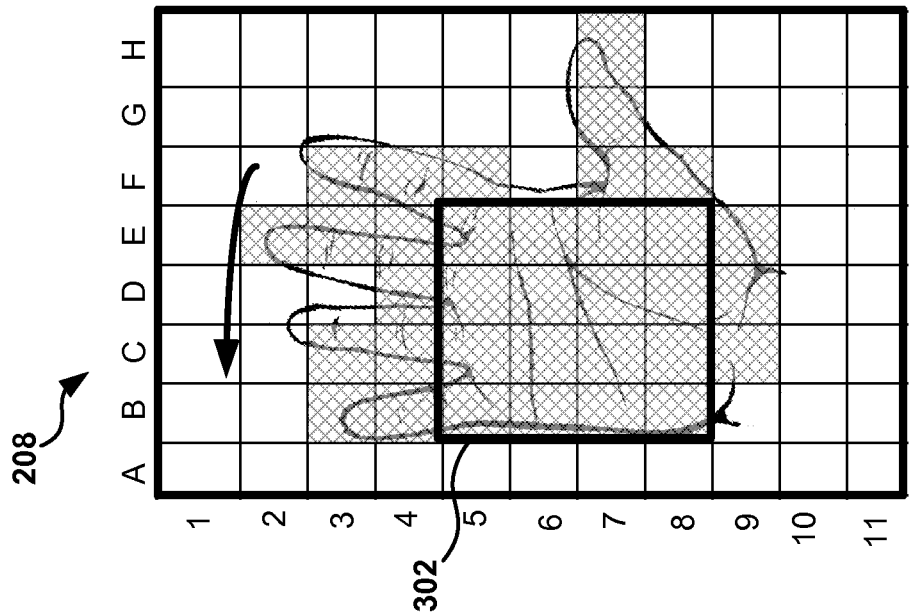
FIGS. 3(a)-3(b) depict one implementation of segmenting images to detect a shape of an object within the images.
Figure 3A:
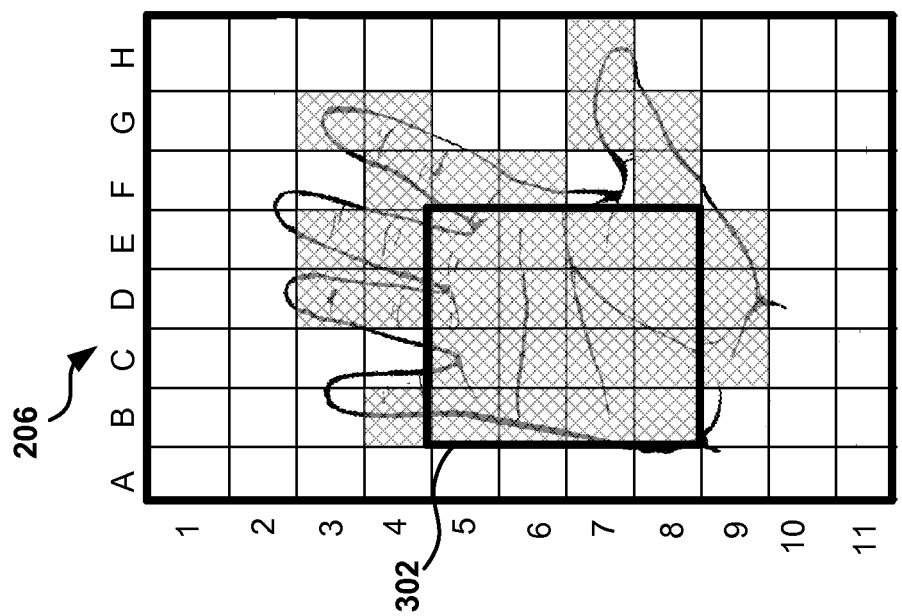

FIGS. 3(a)-3(b) provide additional details, in accordance with one implementation for assessing if the object in the camera's field of view is representative of the shape of a hand. FIGS. 3(a)-3(b) depict one implementation of segmenting a plurality of images to determine an object's shape. Segmenting a series of images 206, 208 may be accomplished by dividing the images 206, 208 into a series of blocks as illustrated by the blocks represented by the intersections of columns A-H and rows 1-11 in each of the image 206 of FIG. 3(a) and the image 208 of FIG. 3(b). By comparing corresponding segments of the images 206, 208 an identification can be made of a large surface area 302 that remains mostly stationary between the images 206, 208, as illustrated by the shaded segments B5-E8 in each of images 206, 208. In addition, the large surface area 302 in each of the images 206, 208 of FIGS. 3(a) and 3(b) are surrounded on one side by segmented blocks that appear to represent elongated objects that extend away from the large surface area 302 and move slightly between the images 206, 208. For example, in image 206 of FIG. 3(a) the shaded segments B4, E3, D4, E3, E4, F4, G3, G4, G7, H7, F8, G8 appear to represent elongated objects protruding away from the large surface area 302. Likewise, in comparing the segments containing pixels that represent those elongated objects, while segments D3, D4, E3, E4 are of a similar color in image 206, as illustrated by the shading areas, in image 208 block D3 has changed to a different color, such as a background. Other segments in the area above the large surface area 302 have also changed colors as a result of the object slightly moving.

Based on the identification of a large surface area 302 surrounded by multiple elongated objects extending away from the large surface area and identification that those elongated objects are moving more than the large surface area 302, an assessment can be made that the object represents the shape of a hand and the large surface area 302 is the palm of the hand. Upon assessment that the object moving into the camera's field view is representative of a shape of a hand, further analysis may be performed to verify the object as a hand and to generate a custom color spectrum. For example, one or more color value samples may be obtained from pixels within the large surface area 302 and compared to a predefined color spectrum containing color values of human skin. Color value samples may be obtained from either the initial image 206, the following image 208, or both images 206, 208. Likewise, the color value samples may be obtained from the same segment within the larger surface area 302 or from different segments of the larger surface area 302.

As discussed in more detail below, upon sampling of colors values from within the larger surface area 302, a comparison may be made with the RGB values against a predefined color spectrum that includes color values of human skin tones. In some implementations, the predefined color spectrum may be a broad range of color values that if used to try and track a hand would likely result in background information being included in the captured image, thereby making hand tracking inoperable. In some implementations, the color spectrum against which the pixel colors are compared may be a previously created custom color spectrum that is associated with the user of the device.

Upon verification that the color value samples obtained from one or more segments representing the large surface area 302 of the object match a value in the predefined color spectrum, and upon identification of an object having a shape similar to a hand, a determination may be made that the object is a hand. The sampled color values may then be used to generate a custom color spectrum for use in identifying and tracking the user's hand as it moves within the camera's field of view. In some implementations, the custom color spectrum may include a varying modification of the color value sample so that slight modifications of the hand color as is captured by the cameras lens will be detected properly. For example, minimum and maximum values for each of the RGB values may be established and any combination within those ranges may be included in the custom color spectrum.

In some implementations, techniques other than comparing color value samples with a predefined color spectrum may be utilized to further determine whether the object is a hand. For example, a depth of focus may be used to cancel out color values for objects that are not in focus within the camera's field of view and the resulting image used to determine whether the object is a hand. Alternatively, any other existing technique use for identifying objects in an image may be used to support verification that the detected object is a hand.

In still other implementations, verification as to whether the object is representative of a hand may be omitted. For example, if the segmentation of images generates an object shape such that a high degree of confidence exists that the shape is representative of a hand, additional verification may be omitted and color values from the large surface area 302 used to generate a custom color value sample, as discussed below.

In still other examples, a user may select whether verification is to occur. For example, if the user is wearing a pink glove, verification of the object by comparing color value samples with a predefined color spectrum that includes skin tone values would not be effective. In such an example, the user and/or device may determine that verification is to be omitted.

FIG. 4 illustrates a flow diagram of an example process for automatically generating a color spectrum based on information obtained from a series of images. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process.

The example process 400 begins upon receipt of a series of images of a camera's field of view, as in 402. As images are received, they are monitored to identify two consecutive images that include an object that is mostly stationary, as in 404. A stationary object, also referred to herein as a reduced motion flow object may be any object that has moved into the camera's field of view and is mostly stationary between two consecutive images. While the example process may be done upon activation of a camera, in some implementations, custom color spectrum generation may be done during setup. For example, the device may request the user to move their hand into the camera's field of view so a custom color spectrum can be generated. In other examples, a user may initiate the example process 400. In still another implementation, detection of a hand and custom color spectrum generation may be done upon the occurrence of specific events that correlate with the hand likely being in the cameras field of view. For example, if the computing device includes a touch screen, upon the occurrence of a touch event, such as a user touching the touch screen with their hand, the example process 400 may be performed to capture and identify a hand for use in generating a custom color spectrum.

Upon identification of a mostly stationary object, a determination is made as to whether the immediately preceding image includes a high motion flow object, as in 406. If it is determined that the prior image does not include a high motion flow object, the example process 400 returns to block 404 and continues. However, if it is determined that the prior image does include a high motion flow object, the two consecutive images with a reduced motion flow object are segmented for further processing, as in 408. Image segmentation may be accomplished using a variety of techniques. For example, images may be segmented into uniform blocks for further processing and comparison. In other implementations, images may be segmented into regions, such as color regions. Any technique for segmenting and comparing two images may be utilized with the implementations described herein.

Upon segmenting of the two consecutive images, elongated objects with higher motion flow blocks (e.g., fingers) are identified, as in 410. In addition, the example process 400 searches for and identifies a larger surface area that includes a lower motion flow blocks (e.g., palm), as in 412. In some implementations, the orientation and location of the higher motion flow blocks with respect to the larger surface area of lower motion flow blocks may be used to help identify a potential object. As discussed above, fingers are typically represented by a series of elongated segments extending away from a larger surface area and the fingers typically move more in comparison to the larger surface area (e.g., palm).

Upon segmenting the two consecutive images and identifying elongated segments and a large surface area segment, a determination is made as to whether the shape of the object is representative of a user's hand, as in 414. If it is determined that the shape of the object does not resemble that of a hand, or if a large surface area surrounded on a side by elongated segments is not identified, the example process 400 returns to block 404 and continues. However, if it is determined that the shape of the object represented by the large surface area and the elongated sections does resemble that of a hand, one or more color value samples may be obtained from the large surface area that includes the lower motion flow blocks, as in 416. In some implementations, the process of determining whether the shape of the object resembles a hand may be eliminated. In such an implementation, a large surface area with low motion flow blocks may be identified, as in 412 (higher motion blocks may or may not be identified, as in 410, an color value samples may be obtained from the large surface area, as in 416.

Regardless of whether the object is determined to resemble a hand or if that portion of the example process is not performed, in some implementations, the one or more color value samples may be obtained from the first of the two consecutive images or from the second of the two consecutive images. Likewise, if multiple color value samples are obtained, they may all be obtained from either the first of the two consecutive images, from the second of the two consecutive images, or from both the first and second image.

Once the one or more color value samples are obtained, they may be verified as to whether they are the color of human skin, as in 418. In one implementation, the color value samples may be verified as representative of a user's skin color by comparing the color value samples with a predefined color spectrum that includes values of human skin color. The predefined color spectrum may be a broad color spectrum, a narrow color spectrum or any variation there between. In some implementations, the predefined color spectrum may be a custom color spectrum previously generated in accordance with the various implementations described herein. In still other examples, the predefined color spectrum may not include skin color values. For example, if the user is wearing gloves of a known color the predefined color spectrum may include color values similar to the color of the user's glove.

If the color value samples are verified, as in 420, a custom color spectrum may be generated based upon the obtained color value samples and used to continue tracking the object as it moves within the cameras field of view, as in 422. In addition, the generated custom color spectrum may be associated with an identified user of the client device. Likewise, the shape of the object that has been identified as the user's hand may also be associated with the user of the client device, as in 422. Finally, if it is determined that the color value samples are not verified, as in block 420, the example process 400 returns to block 404 and continues.

Figure 5:
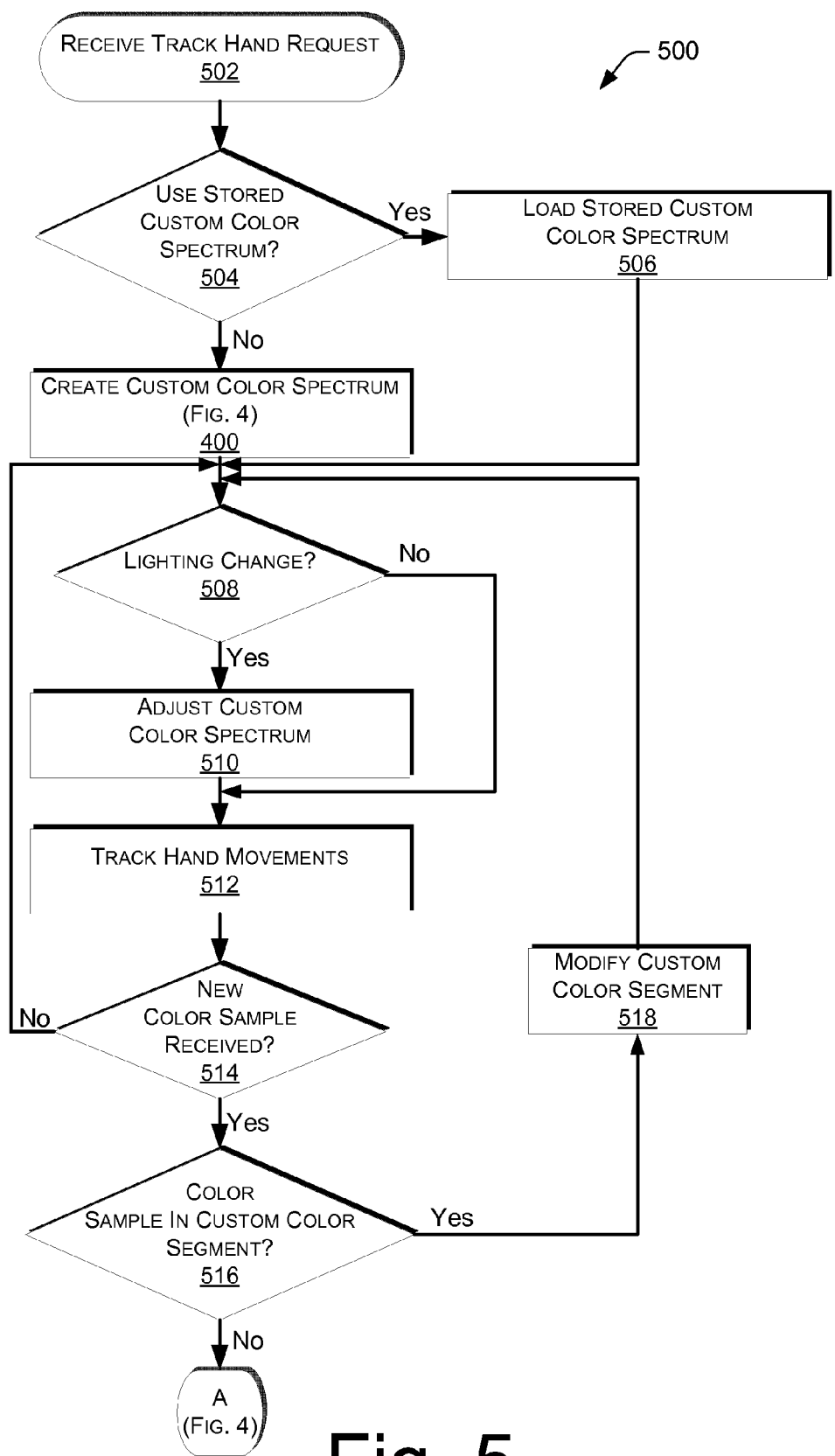
FIG. 5 illustrates a flow diagram of an example process for updating a custom color spectrum used for tracking movement of an object in a cameras capture range.

FIG. 5 illustrates a flow diagram of an example process 500 for tracking movement of a hand while it is within a camera's field of view. Example process 500 may be continually performed on a client device, upon detection of movement within the camera's field of view, upon request by a user of the client device, or in response to one or more events. For example, example process 500 may begin upon receipt of a track hand request, as in 502. Upon receiving a track hand request, or other initiation of the example process 500, a determination is made as to whether a stored custom color spectrum and/or stored hand shape should be utilized, as in 504. For example, if the example process 400 (FIG. 4) has previously been performed for a user of a client device that is performing process 500, the resulting custom color spectrum may be associated with a user and stored. In some implementations the custom color spectrum associated with a user may be stored locally on a client device, at a remote computing resource, or both. Likewise, a custom color spectrum and/or shape of a hand associated with a user of a client device may be utilized by any client device that is able to access the associated custom color spectrum when the device is used by the same user.

If it is determined that a stored custom color spectrum should be used, the stored custom color spectrum is retrieved for use in tracking a user's hand, as in 506. However, if is determined that there is no stored or accessible custom color spectrum for the user, or that a stored custom color spectrum is not to be used, a custom color spectrum may be created using the example process 400 (FIG. 4).

Once a custom color spectrum has been identified for use, a determination is made as to whether the environment surrounding the device has changed since the custom color spectrum was generated, as in 508. For example, when a user's associated custom color spectrum was originally generated, the user may have been indoors and the lighting condition currently present may be that of an outdoor environment, or an environment with altered lighting conditions. In some implementations, an environmental change may be the result of an illumination element of the client device illuminating a light source. Alternatively, the environmental change may be the result of a display screen backlight of the user device illuminating the area within the camera's field of view. In some implementations, the environmental change may be detected through a light sensor, such as an ambient light sensor, present on the client device.

If it is determined that the environment has changed, the custom color spectrum may be adjusted to account for the altered conditions. For example, the RGB values of the custom color spectrum may be altered such that they match the appearance of those colors under the current environmental conditions. Alternatively, in some implementations, the process 500 may return to the example process 400 (FIG. 4) and generate a new custom color spectrum for use in tracking a user's hand.

If it is determined that the environmental conditions have not changed, as in 508, or after adjusting the custom color spectrum as in 510, the example process 500 may continue tracking a user's hand movement within a camera's field of view based on the custom color spectrum, as in 512. As noted above, using a custom color spectrum to track hand movements by identifying matching colors within an image captured from a cameras field of view is a low-power technique to easily track hand movements. Creating a custom color spectrum based on color value samples retrieved from the hand to be tracked improves the accuracy of tracking and reduces both the limitations of either not identifying the user's hand or including objects from the background in the image—drawbacks of existing systems.

In addition to creating a custom color spectrum for use in tracking a user's hand and adjusting the custom color spectrum to account for environment conditions, the example process 500 may determine if a new sample set of color values have been received, as in 514. A new sample set may be used to update and/or supplement a custom color spectrum to further improve the accuracy and ability to track a user's hand based on color and to account for continual environmental changes. In some implementations, a new color value sample may be retrieved each time a user's hand moves into a camera's field of view that initially creates a high motion flow object followed by a series of images containing a low motion flow object from which color value samples may be retrieved. Obtaining a new color value sample for use in updating a custom color spectrum may be done continuously, periodically, or at any time. For example, the process for obtaining new color value samples may be continually performed while a user interacts with a device. In other implementations, updating the custom color spectrum may be performed at set time durations, such as every 30 seconds.

If a new color value sample is received, a determination is made as to whether the received color value sample is included in the current custom color spectrum, as in 516. If it is determined that the new color value sample is included in the custom color spectrum, the custom color spectrum may remain unchanged or may be modified as in 518. For example, if the new color value sample is near the maximum or minimum RGB values of the existing custom color spectrum, the custom color spectrum may be expanded to include additional color values surrounding the new color value sample. Upon modifying the existing custom color spectrum, as in 518, or upon determination that a new color value sample has not been received, as in 514, the example process 500 returns to decision block 508 and continues. However, if it is determined in decision block 516 that the new color value sample is not included in the custom color spectrum, the example process 500 may return to the example process 400 and create a new custom color spectrum based on the new color value sample. In some implementations, a newly created custom color spectrum may be added to or otherwise combined with an existing custom color spectrum. Alternatively, multiple custom color spectrums may be maintained for a user.

Figure 6:
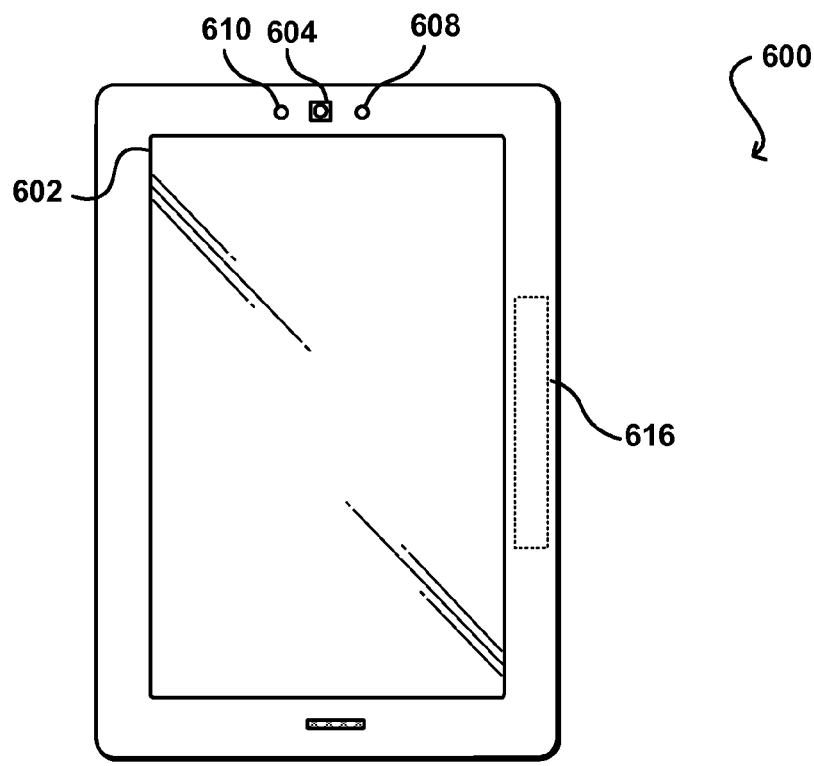
FIG. 6 illustrates an example computing device that can be used in accordance with various implementations.

FIG. 6 illustrates an example computing device 600 that can be used in accordance with various implementations. In this example, the device has at least one conventional digital camera 604 on a same side of the device as a display element 602, enabling the device to capture image information for a user of the device during typical operation. In addition, there may be at least one illumination element 608 (e.g., a white light or IR LED) positioned on the same side of the device such that an object captured by one of the cameras can be at least partially illuminated by the illumination element(s). This example device also includes a light sensor 610, such as an ambient light sensor, that can be used to determine an amount of light in a general direction of an image to be captured. The device may also include at least one orientation-determining element 616, such as an accelerometer, inertial sensor, or electronic gyroscope, operable to determine motion of the device for use in adjusting the relative position of objects in images captured at different times. Various other elements and combinations of elements can be used as well within the scope of the various implementations as should be apparent in light of the teachings and suggestions contained herein.

Figure 7:
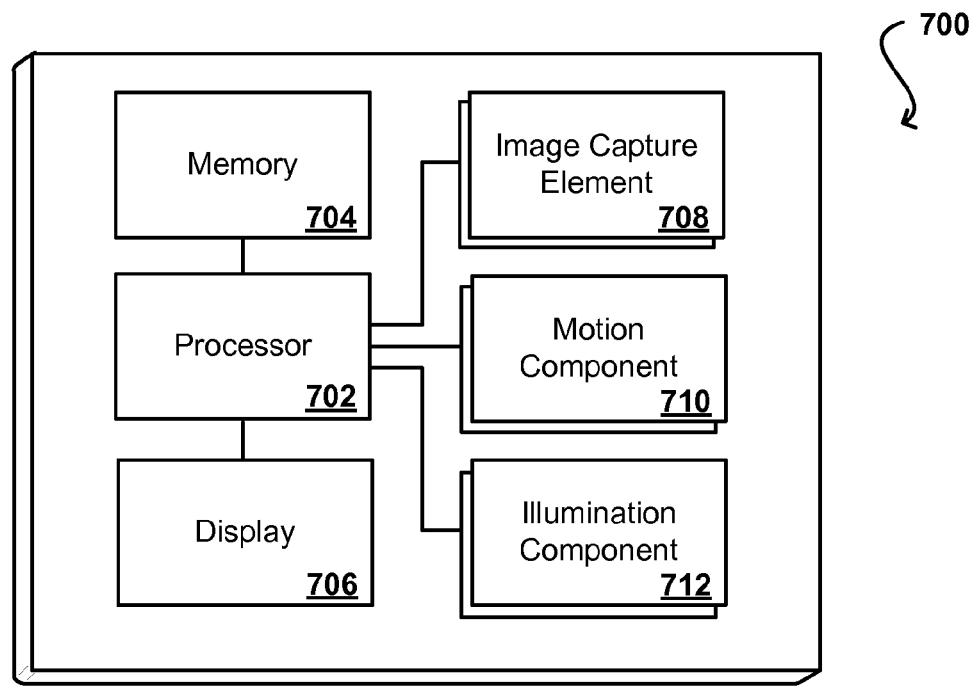
FIG. 7 illustrates an example configuration of components of a computing device such as that illustrated in FIG. 6.

In order to provide various functionality described herein, FIG. 7 illustrates an example set of basic components of a computing device 700, such as the device 600 described with respect to FIG. 6. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc. The device typically will include some type of display element 706, such as a touch screen, electronic ink (e-ink), organic light emitting diode (OLED) or liquid crystal display (LCD), although devices such as portable media players might convey information via other means, such as through audio speakers. In at least some implementations, the display screen provides for touch or swipe-based input using, for example, capacitive or resistive touch technology.

As discussed, the device in many implementations will include at least one image capture element 708, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can include at least one motion component 710, such as an accelerometer, inertial sensor, or electronic gyroscope, operable to detect changes in the position and/or orientation of the device. The device also can include at least one illumination component 712, and may include one or more light sources (e.g., white light LEDs, IR emitters, or flash lamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could be connected by a wireless, infrared, Bluetooth, or other link as well in some implementations. In some examples, however, such a device might not include any buttons at all and might be controlled only through a combination of visual (e.g., gesture) and audio (e.g., spoken) commands such that a user can control the device without having to be in contact with the device.

Figure 8:
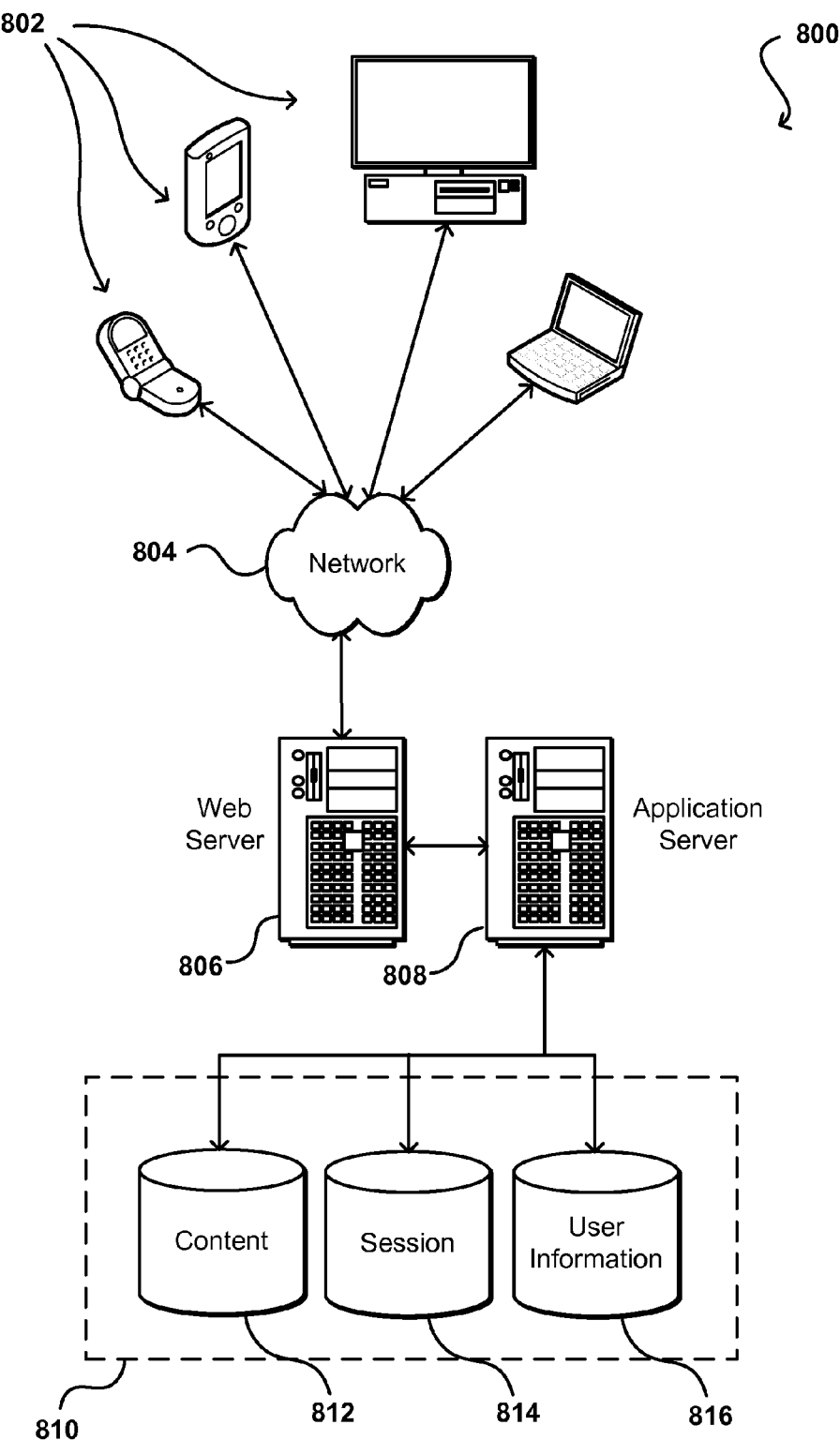
FIG. 8 illustrates an example environment in which various implementations may be utilized.

As discussed, different approaches can be implemented in various environments in accordance with the described implementations. For example, FIG. 8 illustrates an example of an environment 800 in which implementations may be utilized. As will be appreciated, although a Web-based environment is used for purposes of explanation, different environments may be used, as appropriate, for various implementations. The system includes an electronic client device 802, which can include any appropriate device operable to send and receive requests, messages or information over an appropriate network 804 and convey information back to a user of the client device 802. Examples of such client devices 802 include personal computers, cell phones, handheld messaging devices, laptop computers, desktop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device 802 and handling a majority of the data access and business logic for an application. The application server provides access control services in cooperation with the data store 810 and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. In some implementations, that user information 816 may include custom color spectrums established for a user that can be retrieved and used on the user's device 802 or any other device connected to the data store 810 that detects the presence of the user.

It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one implementation is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various examples can be further implemented in a wide variety of operating environments, which in some cases can include one or more user computers or computing devices which can be used to operate any of a number of applications.

User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Some implementations utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In implementations utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of implementations, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate implementations may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
under control of one or more computing devices configured with executable instructions,
identifying a first image, a second image and a third image, the first image captured prior to the second image and the second image captured prior to the third image, wherein:
a first motion flow value between the second image and the third image is below a predetermined threshold, and
a second motion flow value between the first image and the second image is above a predetermined threshold;
determining a hand shape represented in at least one of the second image and the third image based on a comparison of at least a portion of the second image and the third image;
obtaining a first plurality of color values associated with the determined hand shape;
generating a custom color spectrum for use in tracking hand movement based at least in part on the obtained first plurality of color values, wherein at least one of:
a maximum color value of the custom color spectrum is different than a maximum color value of a predefined color spectrum; or
a minimum color value of the custom color spectrum is different than a minimum color value of the predefined color spectrum;
associating the custom color spectrum with a user whose hand shape is represented in at least one of the second image and the third image;

obtaining a plurality of additional images subsequent to the third image;
determining a second plurality of color values represented in the plurality of additional images that are between the maximum color value of the custom color spectrum and the minimum color value of the custom color spectrum; and
tracking a movement of the user's hand based on the second plurality of color values represented in the plurality of additional images.

2. A method as recited in claim 1, wherein the first motion flow value is based at least in part on a change in a plurality of pixel values between the second image and the third image.

3. A method as recited in claim 1, wherein determining a hand shape includes:
segmenting the second image into a first plurality of segments;
segmenting the third image into a second plurality of segments; and
comparing at least one segment of the first plurality of segments with at least one segment of the second plurality of segments to identify an elongated object.

4. A method as recited in claim 3, further comprising:
comparing at least one segment of the first plurality of segments with at least one segment of the second plurality of segments to identify a surface area from which the elongated object extends.

5. A method as recited in claim 4, wherein the surface area represents a palm of the hand shape.

6. A method as recited in claim 1, wherein the hand shape includes a palm portion and the first plurality of color values are obtained from the palm portion.

7. One or more non-transitory computer-readable media storing computer-executable instructions that, when executed on one or more processors, cause the one or more processors to perform acts comprising:
identifying a first image, a second image and a third image, the first image captured prior to the second image and the second image captured prior to the third image, wherein:
a first location of an object represented in the first image is a different location than a second location of the object represented in the second image; and
the second location of the object represented in the second image is approximately a same location as a third location of the object represented in the third image;
segmenting the second image into a first plurality of segments;
segmenting the third image into a second plurality of segments;
determining a palm shape in at least one of the second image and the third image based at least in part on a comparison of at least one segment of the first plurality of segments with at least one segment of the second plurality of segments;
obtaining a first plurality of color values associated with the determined palm shape;
generating a custom color spectrum based at least in part on the obtained first plurality of color values, wherein at least one of:
a maximum color value of the custom color spectrum is different than a maximum color value of a predefined color spectrum; or
a minimum color value of the custom color spectrum is different than a minimum color value of the predefined color spectrum;
associating the custom color spectrum with a user whose palm shape is represented in at least one of the second image and the third image;
obtaining a plurality of additional images subsequent to the third image;
determining a second plurality of color values represented in the plurality of additional images that are between the maximum color value of the custom color spectrum and the minimum color value of the custom color spectrum; and
tracking a movement of the user's palm based on the second plurality of color values represented in the plurality of additional images.

8. One or more non-transitory computer-readable media as recited in claim 7, wherein identifying a palm shape further includes:
identifying a surface area within at least one of the first image and the second image;
identifying a plurality of elongated objects protruding from the surface area; and
defining the surface area as the palm shape.

9. One or more non-transitory computer-readable media as recited in claim 8, wherein first plurality of color values of the surface area are within a color value range.

10. One or more non-transitory computer-readable media as recited in claim 7, the acts further comprising:
storing the custom color spectrum and the association with the user at a remote computing resource.

11. One or more non-transitory computer-readable media as recited in claim 7, the acts further comprising:
periodically updating the custom color spectrum.

12. One or more non-transitory computer-readable media as recited in claim 7, wherein:
generating the custom color spectrum and obtaining additional images are performed at a first device; and
the acts further comprising:
obtaining at a second device, the custom color spectrum;
obtaining at the second device, a second plurality of additional images;
determining a third plurality of color values represented in the second plurality of additional images that are between the maximum color value of the custom color spectrum and the minimum color value of the custom color spectrum; and
tracking a second movement of the user's hand based on the third plurality of color values represented in the second plurality of additional images.

13. One or more non-transitory computer-readable media as recited in claim 12, wherein at least one of the first device or the second device is a portable computing device associated with the user.

14. One or more computing resources comprising: one or more processors; and
one or more non-transitory computer-readable media storing computer-executable instructions that, when executed on the one or more processors, cause the one or more processors to perform acts comprising:
selecting a predefined color spectrum;
capturing an image of an object;
obtaining a color value from the image of the object;
determining that the obtained color value is not included in the predefined color spectrum; and
modifying at least one of a maximum value and a minimum value of one or more color components of the predefined color spectrum based at least in part on the obtained color value.

15. One or more computing resources as recited in claim 14, wherein modifying the predefined color spectrum includes generating a custom color spectrum based at least in part on the obtained color value.

16. One or more computing resources as recited in claim 15, wherein the custom color spectrum is added to the predefined color spectrum.

17. One or more computing resources as recited in claim 15, wherein the custom color spectrum replaces the predefined color spectrum.

18. One or more computing resources as recited in claim 14, the acts further comprising:
    determining, based at least in part on information obtained from an ambient light sensor, that an environmental condition has changed; and
    modifying the predefined color spectrum based at least in part on the changed environmental condition.

19. One or more computing resources as recited in claim 18, wherein the environmental condition is a lighting condition of a camera's field of view.

20. One or more computing resources as recited in claim 19, the lighting condition is a result of an illumination element.

21. One or more computing resources as recited in claim 14, wherein the computer-executable instructions that, when executed on the one or more processors, further cause the one or more processors to perform acts comprising:
    storing the modified at least one of the maximum value and the minimum value of one or more color components of the predefined color spectrum as a custom color spectrum; and
    associating the custom color spectrum with a user.

22. One or more computing resources as recited in claim 14, wherein the computer-executable instructions that, when executed on the one or more processors, further cause the one or more processors to perform acts comprising:
    defining the modified at least one of the maximum value and the minimum value of one or more color components as a custom color spectrum; and
    using the custom color spectrum to detect the object in a second image.

* * * * *